United States Patent [19]

Matsuno et al.

[11] Patent Number: 4,859,847
[45] Date of Patent: Aug. 22, 1989

[54] PHOTO DETECTOR ADJUSTMENT DEVICE

[75] Inventors: Takeshi Matsuno; Kazuo Iwata, both of Ojimamachi, Japan

[73] Assignee: Mitsubishi Denki Kabushiki Kaisha, Tokyo, Japan

[21] Appl. No.: 184,986

[22] Filed: Apr. 22, 1988

[30] Foreign Application Priority Data

Apr. 24, 1987 [JP] Japan ................... 62-101352

[51] Int. Cl.$^4$ ............................... H01J 5/02
[52] U.S. Cl. ........................... 250/239; 369/112
[58] Field of Search ............ 250/201, 239; 369/45, 369/112

[56] References Cited

U.S. PATENT DOCUMENTS 3,091,694 5/1963 Goodridge ..................... 250/239
4,574,371 3/1986 Takemura et al. .............. 369/112
4,634,853 1/1987 Kanamaru ..................... 250/201
4,792,674 12/1988 Hirano ......................... 250/239

Primary Examiner—Edward P. Westin
Assistant Examiner—Khaled Shami
Attorney, Agent, or Firm—Fleit, Jacobson, Cohn, Price, Holman & Stern

[57] ABSTRACT

A device for the adjustment of photo detectors mounted on an optical head base for adjusting the position of a photo detector in a direction of an optic axis of a light beam and in a plane perpendicular to said optic axis, comprises a movable plate able to move relative to the optical head base in a plane perpendicular to the optic axis of a light beam, a base plate able on which the photo detector is fixed, the base plate having a first end fixed to the movable plate, being able to bend to the direction of the optic axis and being fixed to the movable plate, and an adjusting screw extending through the base plate and threaded into the movable plate for bending the base plate toward the movable plate.

8 Claims, 3 Drawing Sheets

4,859,847

PHOTO DETECTOR ADJUSTMENT DEVICE

BACKGROUND OF THE INVENTION

This invention concerns a photo detector adjustment device which adjusts the photo detector in optical disk players and other optical heads.

Generally photo detectors are adjusted in three axial directions.

In other words, there is adjustment in a plane perpendicular to the optic axis and adjustment of the direction of the optic axis. The adjustment in the plane perpendicular to the optic axis is performed to position an optical spot properly on the photo detector. The adjustment in the direction of the optic axis is performed so that offset is not generated when the optical spot focal point dislocation which accompanies disk changes is detected during focal point detection.

A conventional device for the adjustment of photo detectors in optical disk players and other optical heads is shown in FIG. 5. Reference numeral 7 designates a semiconductor laser which is the light source for the optical head. Reference numeral 8 is a half prism which forks the optical path. 9 is a collimitor lens which transforms diffused light into parallel light or parallel light into converging light. 10 is an object lens which converges light. 11 is a holder. 12 is a cylindrical lens contained in the holder for the detection of optical spot focal dislocation on the disk (not shown). 13 is a laser beam.

The adjustment of the optical spot on the photo detector 1 is divided into biaxial adjustment moving the photo detector 1 in plane X-Z perpendicular to the optic axis, and Y axis direction adjustment moving the holder 11 containing the cylindrical lens 17 in the direction of the Y, or optic, axis.

Because the conventional device for the adjustment of photo detectors has the structure mentioned above, the optical spot on the photo detector 1 must be adjusted by repeatedly alternating the biaxial adjustment moving the photo detector 1 in plane X-Z perpendicular to the optic axis, and Y axis direction adjustment moving the holder 11 containing the cylindrical lens 12 in the direction of the Y, or optic, axis. The amount of time this takes is a problem.

SUMMARY OF THE INVENTION

An object of the invention is to provide a device for the adjustment of photo detectors which simplifies the adjustment of the optical spot on the photo detector and shortens the amount of time spent in adjustment.

The photo detector adjustment device according to this invention is constructed of a movable plate which can be adjusted and fixed in a plane perpendicular to the optic axis of a light beam, a base plate which can be bent in the direction of the optic axis, and an adjusting screw which can bend the base plate.

In this invention the photo detector is adjusted in the direction of the optic axis by adjusting the movable plate so that the optical spot of the light beam is located on the plane of the photo detector and resiliently bending the base plate from the adjusting screw.

DETAILED DESCRIPTION OF THE EMBODIMENTS

The following is an explanation of an embodiment of this invention is with reference to the drawings.

Figure 1:
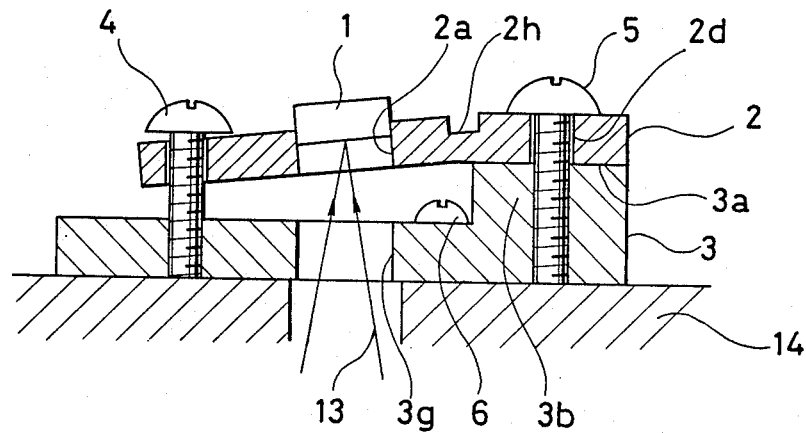
FIG. 1 is a cross section of an embodiment of the invention.
Figure 2:
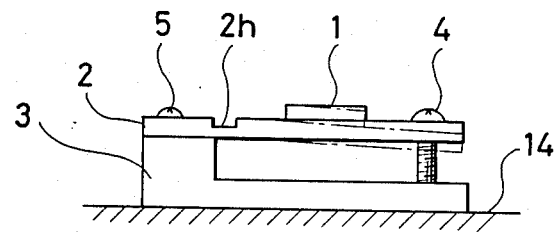
FIG. 2 is a perspective view of the base plate.
Figure 3:
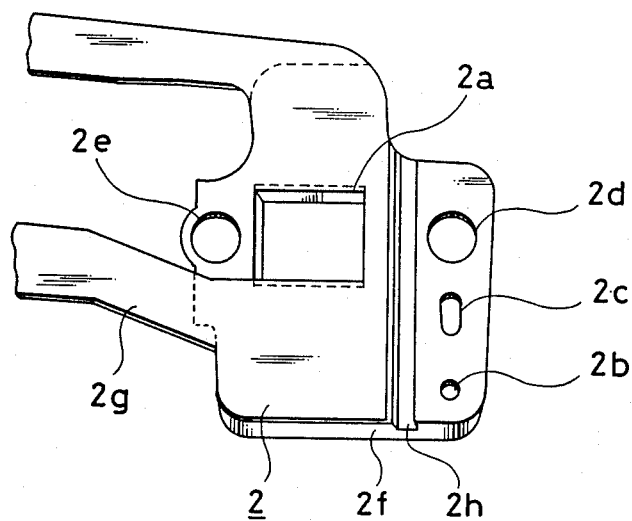
FIG. 3 is a perspective view of the movable plate.
Figure 4:
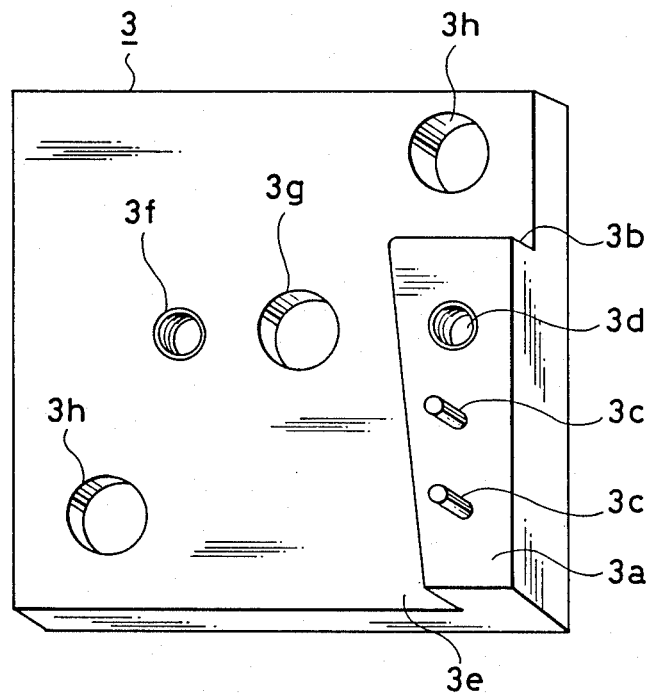
FIG. 4 is an explanatory diagram of the action of photo detector adjustment.
Figure 5:
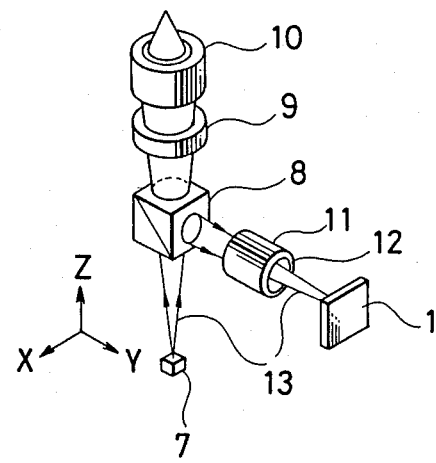
FIG. 5 is a perspective view showing a prior photo detector adjusting device.

FIGS. 1 through 4 show an embodiment of this invention. Reference numeral 1 designates a photo detector. The photo detector 1 is positioned by a rectangular hole 2a and is fixed by the base plate 2. The base plate 2 is provided with a positioning hole 2b for alignment to the movable plate 3, a positioning elongated hole slot 2e, and a female tapped hole 2d fixed by screw, and an adjustment hole 2c through which an adjustment screw 4 runs. The adjusting screw 4 is a fine threaded screw for ease of adjustment.

Also, the base plate 2 is formed of a leaf spring 2f and a flexible printed circuit board 2g by which the photo detector signal is derived. The leaf spring 2f and the flexible printed circuit board 2g are laminated and glued to each other.

There is a concave section 2h extending across the base plate 2 in the direction orthogonal to the length of the base plate 2. When the base plate 2 is bent by tightening the screw 4, the concave section takes the main part of the bend in the direction of the optic axis.

The movable plate 3 includes a thick plate section 3b. The base plate 2 abuts an upper face of the thick plate section 3b. The thick plate section is provided with a positioning pin 3c extending through the positioning hole 2b of the base plate 2 for alignment and a tapped hole 3d into which a screw 5 is threaded for fixing of the base plate 2 to the movable plate 3. The movable plate 3 also includes a thin plate section 3e which has a tapped hole 3f into which an adjusting screw 4 is threaded, a beam hole 3g through which passes the laser beam 13, and a screw hole 3h through which a screw 6 extends. By means of the screw 6, the movable plate 3 is fixed to the optic head base 14.

The following is an explanation of the operation.

The device is so arranged that in the initial state when the base plate 2 is placed on the abutting surface 3a of the movable plate 3 and is fixed with the fixing screw 5 the light receiving surface of photo detector is at a point farther by a certain amount in the direction of the optic axis, than the focal point of the laser beam.

First, rough adjustment is made by tightening the adjusting screw 4 so that the photo detector 1 is at the point on which the laser beam 13 is focused. Then the movable plate 3 is moved relative to the optical head base 14 for adjustment in plane X-Z perpendicular to the optic axis. Following that, fine adjustment in the direction of the optic axis is made tightening or loosening the adjustment screw 4 to the desired position.

Because of the springiness of the base plate 2 there is no play in the adjusting screw 4 and extremely fine, quick adjustment in the direction of the optic axis is possible. After adjustment has been completed, the screw 6 is tightened to fix the movable plate 3 to the optical head base 14.

Also, because the base plate 2 bends for the most part at the concave section 2h, almost no distortion is generated in the area of the base plate 2 where the photo detector 1 is fixed. Thus the fixation of the photo detector 1 to the base plate 2 is highly reliable.

Furthermore, the movable plate 3 has such a height relationship that as the base plate 2 is bent with the adjusting screw 4, free end 2a of the base plate 2 (the end on the side of the adjusting screw 4) engages the movable plate 3 and there is no plastic deformation to the base plate 2. A fine threaded screw is used for the adjusting screw 4 in order to make fine adjustments even easier.

In the above embodiment a base plate fixation screw 5 was used to fix the base plate 2 to the movable plate 3. It may alternatively be fixed by welding or adhesion.

Also, a spring member and a flexible printed circuit board were put together to form the base plate 2. Metal cored boards and other integral boards may also be used inplace.

As described above, this invention adjusts a movable plate so that the optic spot of a light beam is positioned within the plane of a photo detector, and by bending a resilient base plate with an adjusting screw the photo detector can be adjusted in the direction of the optic axis. This allows finer adjustment and reduces the time spent in adjustment.

Also, because there is no need with this invention to move other optical parts when adjusting the photo detector, the invention has the effects of simplifying the structure of the optic head and decreasing costs.

What is claimed is:

1. A device mounted on an optical head base for the adjustment of a photo detector for adjusting the position of a photo detector in a direction of an optic axis of a light beam and in a plane perpendicular to said optic axis, comprising:
    a movable plate able to move relative to said optical head base in a plane perpendicular to the optic axis of a light beam,
    a base plate on which the photo detector is fixed, said base plate having a first end fixed to said movable plate, being able to bend to the direction of the optic axis, and being fixed to said movable plate, and
    an adjusting screw extending through said base plate and threaded into said movable plate for bending the base plate toward said movable plate.

2. A device as set forth in claim 1 with the characteristic of using a fine threaded screw for the above mentioned adjusting screw.

3. A device as set forth in claim 1 with the characteristic of having a concave section on said base plate so that the bending of the base plate to the direction of the optic axis may be performed mostly at the concave section.

4. A device as set forth in claim 1 with the characteristic of said movable plate being composed of a thick section and a thin section and being in a height relationship such that there is no plastic deformation when the base plate is bent.

5. A device as set forth in claim 4 with the characteristic of said base plate having a second end abutting said movable plate before there occurs a plastic deformation due to the bending.

6. A device as set forth in claim 1, wherein said movable plate has a thick part and thin part, said first end of said base plate is fixed to said thick part and a second end of said base plate is movable toward said thin part when said base plate is bent.

7. A device as set forth in claim 6, wherein said thick part has a flat surface perpendicular to said optic axis, and said base plate has a flat surface at its first end abutting said flat surface of said movable plate.

8. A device as set forth in claim 1, wherein said movable plate is slidable against said optical head base parallel to said plane prependicular to said optic axis.

* * * * *